US009706757B2

(12) United States Patent
Edwards

(10) Patent No.: US 9,706,757 B2
(45) Date of Patent: *Jul. 18, 2017

(54) PROCESS FOR UTILIZING DUAL USE PACKAGING FOR A FISH-RELATED PRODUCT

(71) Applicant: Shaun Edwards, Del Mar, CA (US)

(72) Inventor: Shaun Edwards, Del Mar, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/798,950

(22) Filed: Jul. 14, 2015

(65) Prior Publication Data

US 2015/0313190 A1 Nov. 5, 2015

Related U.S. Application Data

(63) Continuation-in-part of application No. 14/185,474, filed on Feb. 20, 2014.

(51) Int. Cl.
*A01K 63/00* (2017.01)
*A01K 61/02* (2006.01)
*A01K 63/04* (2006.01)
*A01K 63/06* (2006.01)
*A01K 61/85* (2017.01)

(52) U.S. Cl.
CPC ............ *A01K 61/025* (2013.01); *A01K 61/85* (2017.01); *A01K 63/006* (2013.01); *A01K 63/042* (2013.01); *A01K 63/06* (2013.01)

(58) Field of Classification Search
CPC ...... A01K 61/00; A01K 61/02; A01K 61/025; A01K 61/006; A01K 63/00; A01K 63/006; A01K 63/06; A01K 61/85; A01K 63/042; A01K 63/04

USPC .......................... 119/253–258, 263, 267–269
See application file for complete search history.

(56) References Cited

U.S. PATENT DOCUMENTS

| | | |
|---|---|---|
| 3,265,388 A | 8/1966 | Kane, III |
| 3,304,912 A | 2/1967 | Hackman et al. |
| 3,324,573 A | 6/1967 | Lavallee |
| 3,326,185 A | 6/1967 | Perez |
| D214,431 S | 6/1969 | Willinger |
| 3,499,526 A | 3/1970 | Willinger |
| 3,874,340 A | 4/1975 | Lemond et al. |
| 4,073,397 A | 2/1978 | Snodgrass |
| D279,317 S | 6/1985 | Goldman et al. |
| 4,787,336 A | 11/1988 | Lineberry |
| 5,143,020 A | 9/1992 | Patrick |
| 5,676,251 A | 10/1997 | Credle, Jr. |
| 5,799,611 A | 9/1998 | Park |
| 5,850,940 A | 12/1998 | Sloan et al. |
| 6,070,554 A | 6/2000 | Wilson |
| 6,109,210 A | 8/2000 | Nasser |

(Continued)

FOREIGN PATENT DOCUMENTS

GB 2196821 A 5/1988

*Primary Examiner* — Joshua Huson
(74) *Attorney, Agent, or Firm* — Kelly & Kelley, LLP

(57) ABSTRACT

In a process for the dual use of packaging for a fish-related product such as fish food or a fish-related consumable product normally dispensed into an aquarium, a package including a compartment is filled with the fish-related product which is then dispensed until depleted. The dual use package is then placed within the aquarium and utilized as a decorative ornament. In this regard, the dual use package may be reconfigured for use as a decorative feature within the aquarium, and ballast may be added to the ornamental container before being submerged.

11 Claims, 14 Drawing Sheets

(56) References Cited

U.S. PATENT DOCUMENTS

| | | |
|---|---|---|
| 6,557,496 B2 | 5/2003 | Herrenbruck |
| 6,591,783 B1 | 7/2003 | Lajeunesse |
| D506,578 S | 6/2005 | Cole |
| 6,948,841 B2 | 9/2005 | Tsai |
| 7,213,537 B2 | 5/2007 | Sabbaugh |
| 7,793,618 B2 | 9/2010 | Edwards et al. |
| D632,023 S | 2/2011 | Goldstein |
| 7,918,187 B2 | 4/2011 | Bagnall |
| 8,001,932 B2 | 8/2011 | Kania et al. |
| 2004/0163605 A1 | 8/2004 | Sabbaugh |
| 2005/0022749 A1 | 2/2005 | Amblard |
| 2014/0261211 A1 | 9/2014 | Tuan et al. |

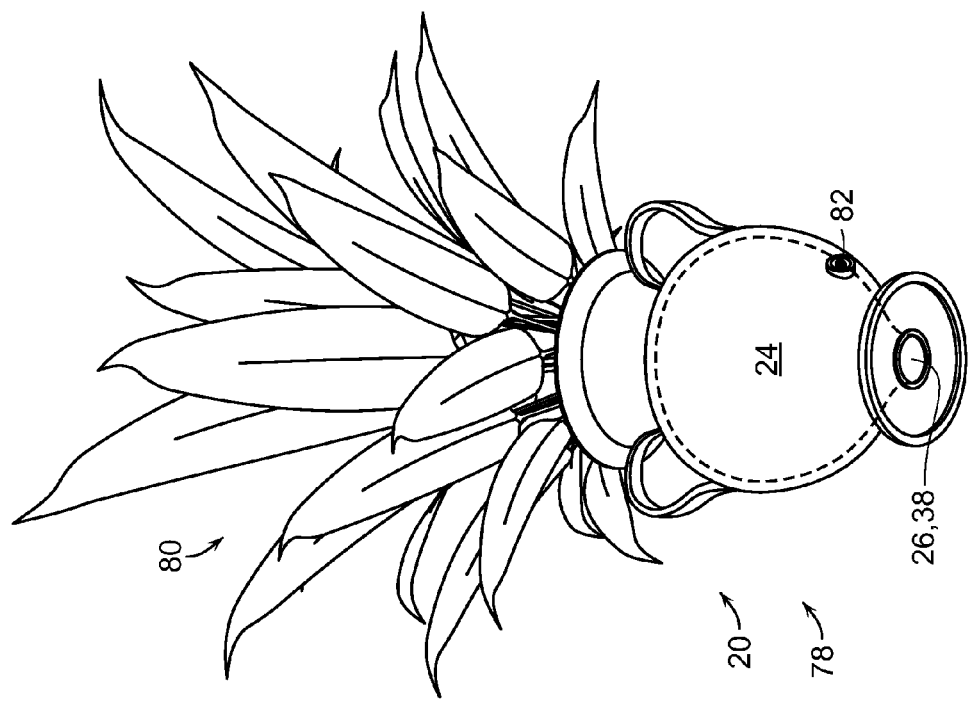
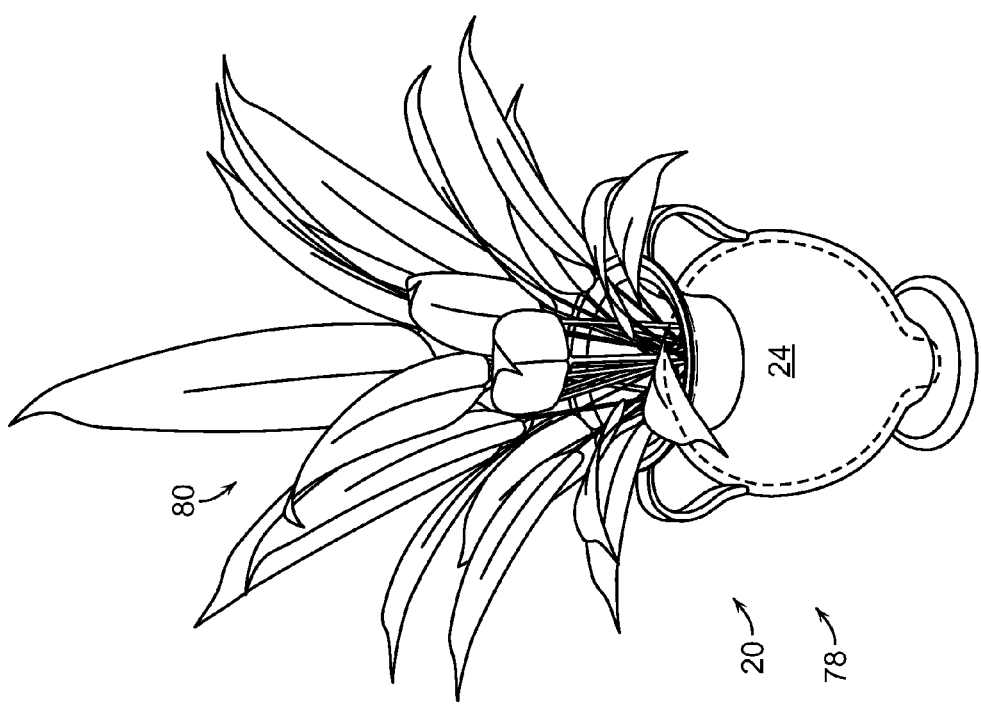

PROCESS FOR UTILIZING DUAL USE PACKAGING FOR A FISH-RELATED PRODUCT

RELATED APPLICATION

This application is a continuation-in-part of U.S. application Ser. No. 14/185,474, filed Feb. 20, 2014.

FIELD OF THE INVENTION

The present invention generally relates to dual use packaging. More particularly, the present invention relates to the use of a package for dispensing a fish-related product and then utilizing the package as a decorative ornament in an aquarium.

BACKGROUND OF THE INVENTION

Single use containers for retaining pet-related products, whether liquid or solid, are generally known in the art. Such containers may include hard outer shells or soft outer shells that are squeezable. Either way, the containers include an internal compartment with an opening to access the internal compartment. The internal compartment contains the pet-related product and allows a user to dispense the product from the container until the container is empty. Once the container is empty there is no use other than to possibly re-use the container to hold more pet-related product.

It would be advantageous to find another use for the empty containers and used packaging once the pet-related product has been dispensed. Accordingly, there is a need for a product and a process for utilizing such product for dual purposes. The present invention fulfills these needs and provides other related advantages.

SUMMARY OF THE INVENTION

The present invention is directed to a process for the dual use of packaging for a fish-related product such as fish food or a fish-related consumable product normally dispensed into an aquarium. The process comprises the steps of (1) providing a dual use package including a compartment for containing the fish-related product therein, (2) dispensing the fish-related product from the compartment, and (3) placing the dual use package within the aquarium. The dual use package may be reconfigured for use as a decorative feature within the aquarium, wherein the process includes the step of adding a decorative element to the dual use package.

The decorative element may comprise a light fixture, a decorative elastomeric cover over at least a portion of the dual use package, and applique applied, at least in part, to a surface of the dual use package, or a bubbler. The reconfiguring step may further include the step of removing the decorative element from the dual use package prior to placing it into the aquarium.

The process may further include adding ballast to the internal compartment, attaching an anchor to the package and securing the anchor within the aquarium, or causing the reconfigured package to be buoyant in the water and attaching an anchor to the package by a length of fine cord which is secured to the aquarium. The reconfigured package may further be reoriented while submerged in the aquarium. Moreover, the bubbler may be configured so as to create movement of at least a portion of the dual use package when submerged in the aquarium.

More specifically, ballast may be added to the internal compartment or externally to the package before utilizing the package as a decorative ornament. The ballast may comprise aquarium rocks or similarly dense material sufficient to hold the package submerged under water. Alternatively, the process may include attaching an anchor device, i.e., disc or pad, to a base or any other part of the package and securing the anchor device to an interior surface of the aquarium as by suction cup, covering with rocks, or the like. The anchor may comprise a threaded cap configured to attach to a threaded neck as on the opening to the internal compartment. The threaded cap may be removably attached to the threaded neck.

In addition, the reconfiguring step may include removing a plug from a secondary opening to allow air trapped in the internal compartment to escape once the dual use package is submerged and reoriented in the aquarium. The plug or plugs may also be permanently removed to expose openings for design purposes, such as the eyes or mouth of a statue.

The dual use package may resemble a lighthouse with a decorative element comprising a light feature in a top of the lighthouse. The package may also resemble a treasure chest with the decorative element comprising a hinged lid capable of pivoting movement about the hinge. A bubbler may be attached to a fitting on the treasure chest such that air may be bubbled into a cavity on the hinged lid. As the air fills the cavity on the hinged lid, the hinged lid periodically lifts due to the buoyancy of the air in the water and releases the air such that the lid falls back down. The light source, movable parts, and bubbler are not limited to these packages, but may also be applied to other dual use packages as well.

The dual use package may also resemble a rock sculpture and the decorative element may comprise a passage through the rock sculpture. The package may resemble a wall block and the decorative element may comprise a stone or brick pattern. The wall block may further have a slot on a first side and a tongue on a second side. The process may further comprise the step of attaching the tongue of the wall block to a slot on a second wall block so as to form a longer wall. The through passage as well as the tongue and slot can also be applied to other dual use packages.

The dual use package may resemble a submarine with the decorative element comprising a plurality of LED lights along a length of the submarine and/or a propeller at a rear of the submarine. The decorative element may also include a bubbler attached to a fitting on the submarine and bubbling air into the propeller so as to turn the propeller.

The dual use package may further resemble a vase with the decorative element comprising a plant having leaves extending from a top of the vase. A bubbler may be attached to a fitting on the vase for bubbling air into the leaves of the plant so as to move the leaves.

The dual use package may also be very simple in design and be made to provide a structural support to a decorative elastomeric cover over at least a portion of the dual use package. The decorative elastomeric cover may resemble a variety of different fish, animals, and objects.

The dual use package may also be a simple cylindrical package, already known in the art, with a lid that is designed to be an aquarium ornament such as an ancient coin, pile of treasure, seashell, etc. The reconfiguration step includes removing this decorative element from the package. In the alternative the lid could have a removably attached ornament, such as a statue, for which the lid would act as an anchoring device.

In any of the foregoing embodiments, the reconfiguring step may include adorning the surface of the dual use package with a mirror, lenticular, or holographic, material that produces three-dimensional or moving images on a two-dimensional surface. The package may also have an appliqué applied to at least part of the surface to give the package a realistic appearance. Such material may be adhered to the outer surface of the package to produce a desired visual presentation.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 6A is an elevated perspective view of a dual use package that resembles a vase;

FIG. 6B is a lower perspective view of a dual use package that resembles a vase;

DETAILED DESCRIPTION OF THE PREFERRED EMBODIMENTS

Figure 1A:
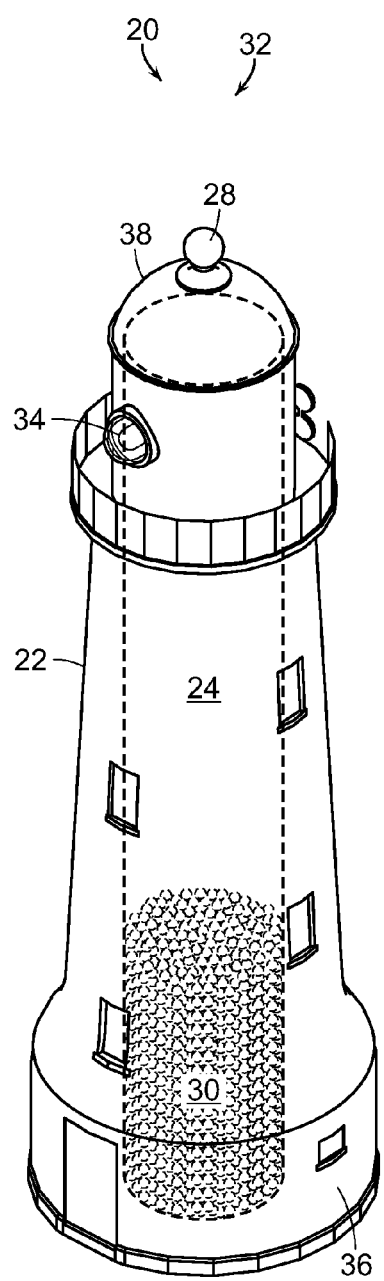
FIG. 1A is a perspective view of a dual use package that resembles a lighthouse.

The present invention is directed to a process for utilizing dual use packaging. More particularly, the present invention is directed to a process for using a dual use package for a pet-related product such as fish food and then reconfiguring that dual use package as an ornamental decoration in an aquarium.

The dual use package, generally referred to by reference numeral 20 herein, is depicted in FIGS. 1-21 in various embodiments. The dual use package 20 generally comprises an outer structure or housing 22, an internal compartment 24 and an opening 26 for accessing the internal compartment 24. The package 20 may also comprise a plug 28 or similar structure, i.e., diaphragm, membrane, etc., covering a secondary opening 26a which is typically smaller than the primary opening 26. The secondary opening 26a is configured primarily for the purpose of releasing air that may be trapped in the internal compartment 24 when the package 20 is submerged in an aquarium. In some of the embodiments, the plug or plugs 28 may be permanently removed for a particular design feature as will be described. The dual use package 20 may be decorated or itself comprise ornamental features, as described below.

When the dual use package 20 is initially prepared it contains a quantity of a pet-related product 30. Such pet-related product 30 preferably comprises food as the dual use package 20 is primarily directed towards use with fish and other aquarium-related pets. The pet-related product 30 may comprise food, water treatment chemicals, or other products commonly used with fish or other pets kept in an aquarium whether filled with water or not. The dual use packages 20 are preferably made from non-toxic plastic and decorated with aquarium-safe non-toxic paint, by dyed plastics, or by applying a colored shrink wrap to the packages 20. The packages 20 may be made from typical injection molded, blow molded, or rotary molded processes. The decorations may also be provided by stickers using non-toxic adhesive. The decorations may be three-dimensional protrusions or two-dimensional paint or stickers.

Figure 1B:
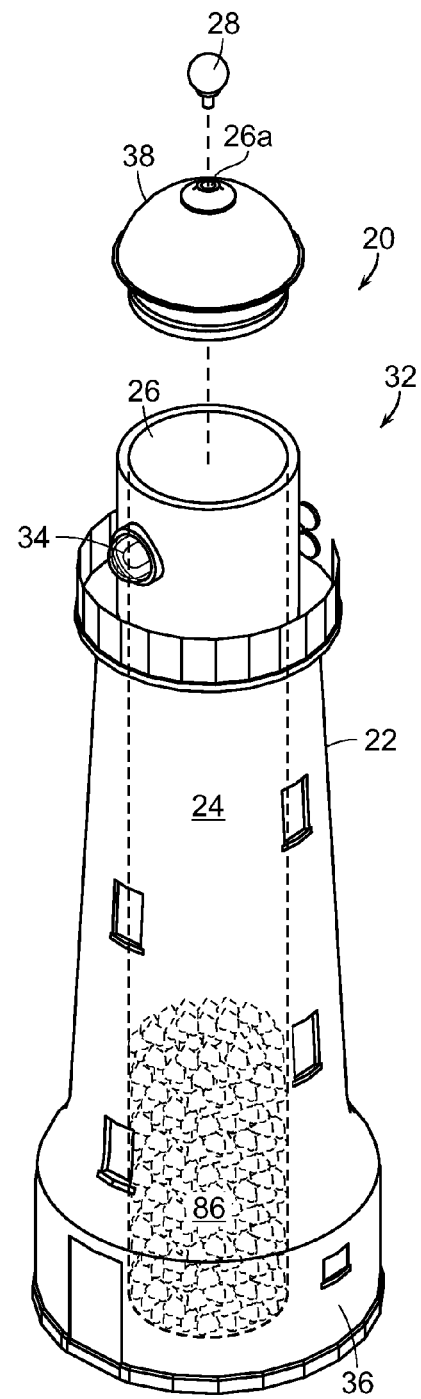
FIG. 1B is an exploded perspective view of a dual use package that resembles a lighthouse.

FIGS. 1A and 1B illustrate a first preferred embodiment of the dual use package 20 of the present invention. In this embodiment, the dual use package 20 is shaped to resemble a lighthouse 32. The top of the lighthouse 32 includes a light source 34, as an LED or other type of light, configured to resemble the light found in an actual lighthouse. The internal compartment 24 is illustrated using dashed lines to indicate that it is inside of the lighthouse 32. The internal compartment 24 is configured such that the lighthouse 32 includes a base portion 36 that gives the bottom of the lighthouse 32 sufficient weight to remain upright in a buoyant environment such as when submerged in an aquarium.

A cap 38 included in the top of the lighthouse 32 covers the opening 26 to the internal compartment 24. Being the highest-most point on the lighthouse 32, the top of the cap 38 includes the plug means 28 covering the secondary opening 26A. The cap 38 may be removable or hingedly attached to the dual use package 20.

Figure 2A:
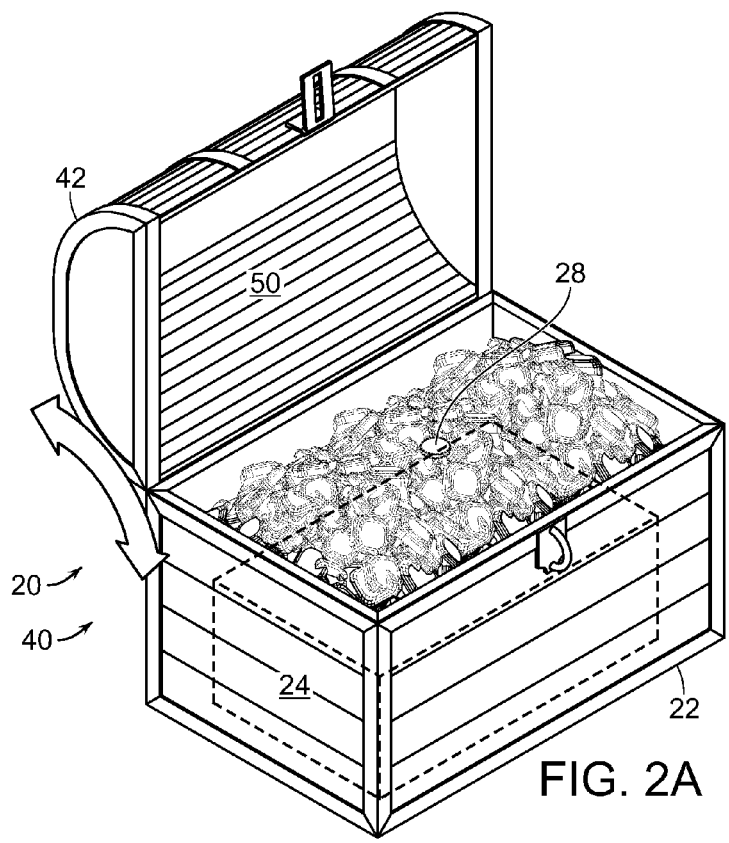
FIG. 2A is an elevated perspective view of a dual use package that resembles a treasure chest.
Figure 2B:
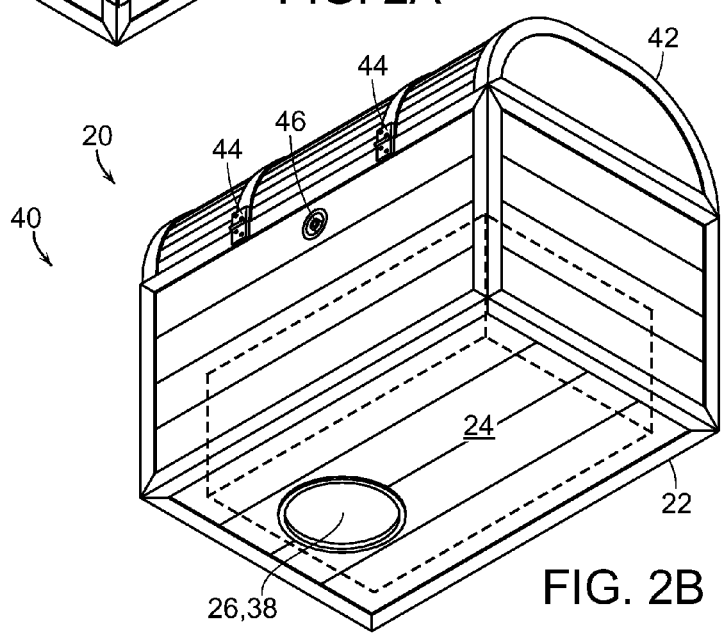
FIG. 2B is a rear lower perspective view of a dual use package that resembles a treasure chest.

FIGS. 2A and 2B illustrate another alternate embodiment of the dual use package 20 of the present invention. In this embodiment, the package 20 is configured to resemble a treasure chest 40 having a lid 42 connected to the chest 40 by a pivoting hinge 44 and containing a quantity of treasure. The chest 40 may include one or more light sources to resemble twinkling gems in the treasure. The internal compartment 24 is disposed in a base of the chest 40 and the opening 26 is preferably on the bottom. The plug 28 and secondary opening 26a are located under the lid 42. A fitting 46 is disposed preferably on a back of the treasure chest 40 to provide an attachment point for an air bubbler tube 48 that releases air into an interior cavity 50 of the lid 42. The lid 42 is sufficiently weighted such that it rests in a substantially closed position when the chest is submerged. As air from the bubbler tube 48 fills the cavity 50 in the lid 42 the buoyancy of the lid 42 changes. Once a sufficient quantity of air fills the cavity 50 the buoyancy of the air overcomes the weight of the lid 42 such that it raises in the water to release the trapped air. Once the trapped air is released, the lid 42 falls under its own weight such that it is again substantially closed against the base of the chest 40. The process repeats as long as air continues to bubble through the tube 48.

Figure 3A:
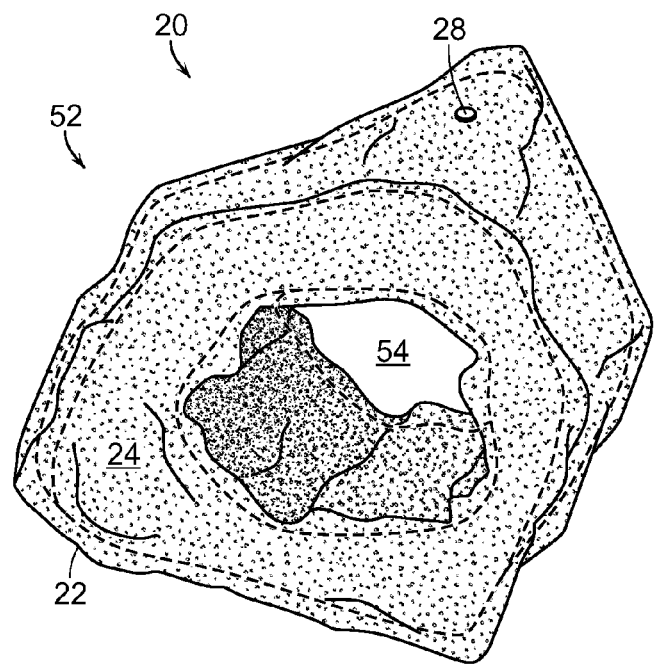
FIG. 3A is an elevated perspective view of a dual use package that resembles a rock sculpture.
Figure 3B:
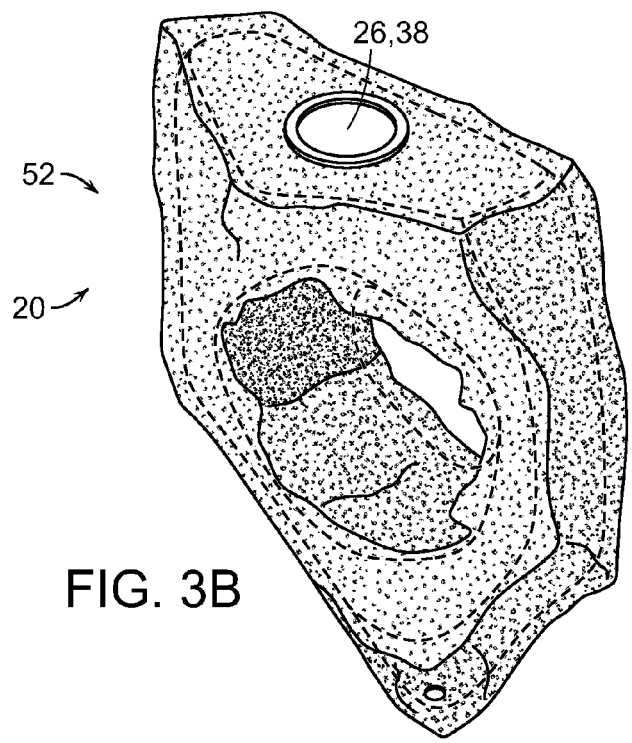
FIG. 3B is an inverted perspective view of a dual use package that resembles a rock sculpture.

FIGS. 3A and 3B illustrate another alternate embodiment for the dual use package 20 of the present invention. In this embodiment, the package 20 resembles a rock sculpture 52. The rock sculpture 52 preferably resembles any type of rock that may be found under water or in an aquarium and may include a tunnel or passage 54 through the sculpture. The tunnel or passage 54 may allow a fish or other inhabitant of the aquarium to pass therethrough. The tunnel or passage 54 may be included in any of the other embodiments to allow a fish to swim therethrough. The passage 54 may be included in another sculpture, such as a castle, home, or similar building. The opening 26 is preferably on an underside of the rock sculpture 52 so as not to be visible when placed in the aquarium. The plug 28 and secondary opening 26a are preferably disposed on the top of the rock sculpture 52 so as to be in the highest position when the same is placed in an aquarium. The internal compartment 24 is illustrated in dotted lines and preferably surrounds the tunnel or passage 54.

Figures 4A, 4B:
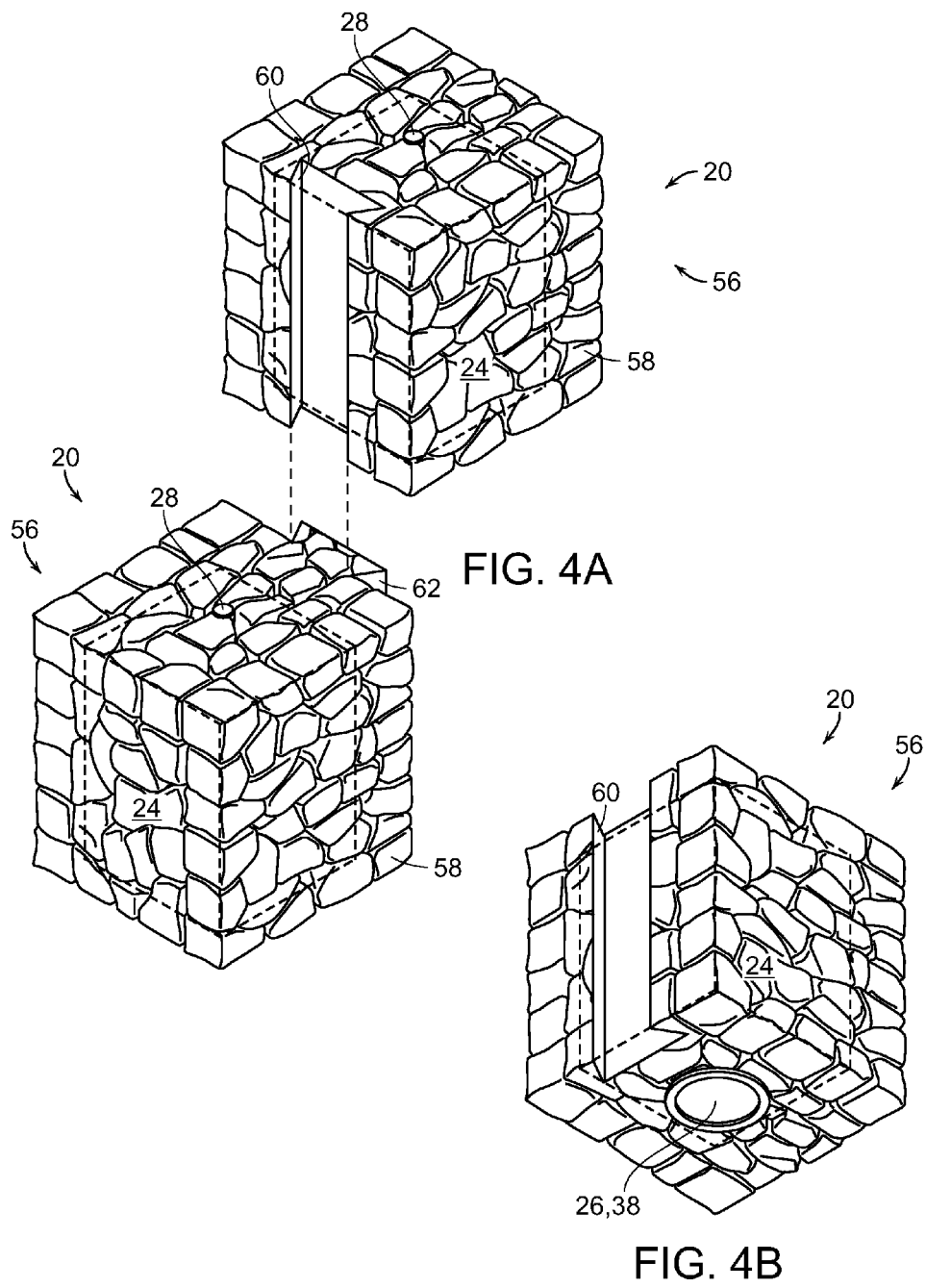
FIG. 4A is an elevated perspective view of a dual use package that resembles two wall blocks.
FIG. 4B is a lower perspective view of a dual use package that resembles a wall block.

FIGS. 4A and 4B illustrate another alternate embodiment of the dual use package 20 of the present invention. In this alternate embodiment, the package 20 resembles a wall block 56 or similar design. The surfaces of the wall block 56 preferably have a pattern or decoration such as a stone or brick pattern 58. The opening 26 is preferably disposed on the bottom of the wall block 56 so as to be hidden from view when the wall block 56 is placed in an aquarium. The plug 28 and secondary opening 26a are preferably disposed on a top surface of the wall block 56.

One side of the wall block 56 may include a slot or groove 60 configured to receive a tongue 62 disposed on a surface of another wall block 56. In this way, the tongue 62 of one wall block 56 may be inserted into the slot or groove 60 of a second wall block 56 so as to assemble a longer wall structure. The wall block 56 may be sold having both a slot 60 and a tongue 62. Alternatively, the wall blocks 56 may be sold having only one of the tongue 62 and slot or groove 60. In this way, a wall assembled from multiple wall blocks 56 may be constructed such that an exposed tongue 62 or slot or groove 60 is not visible in an assembled wall segment. Multiple wall blocks 56 may be connected by other structures, such as studs and holes, i.e., LEGO®-type connectors. The slot or groove 60 as well as the tongue 62 are not limited to the rock wall embodiment, but can be expanded to include any alternate embodiments, for example, to attach statues together.

Figure 5A:
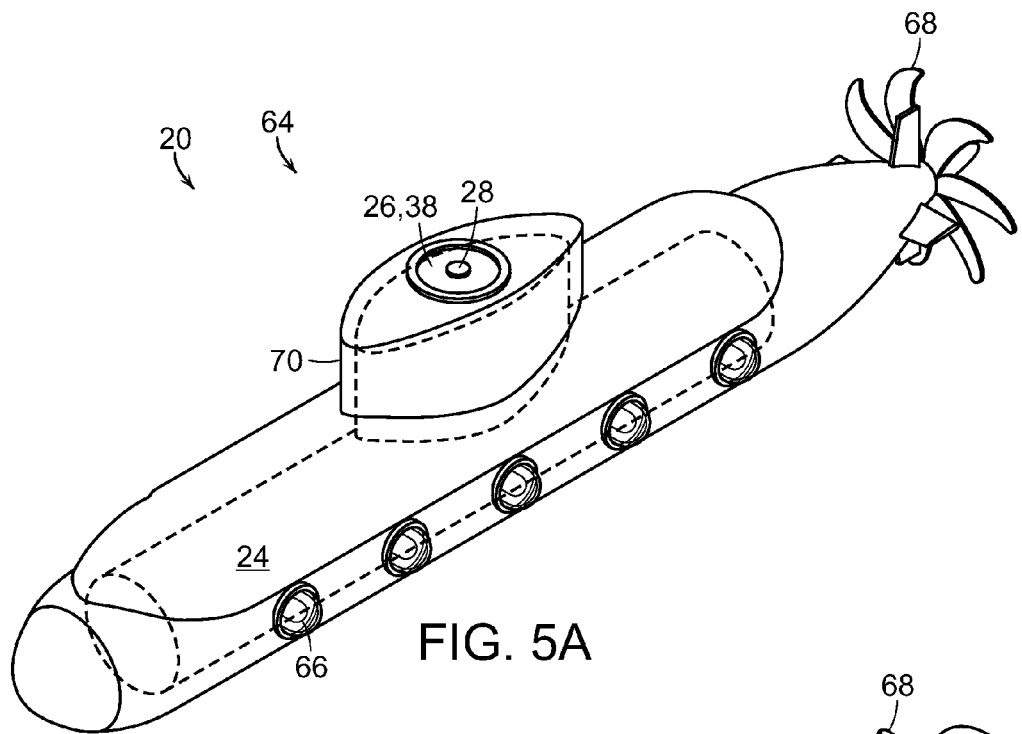
FIG. 5A is an elevated perspective view of a dual use package that resembles a submarine.
Figure 5B:
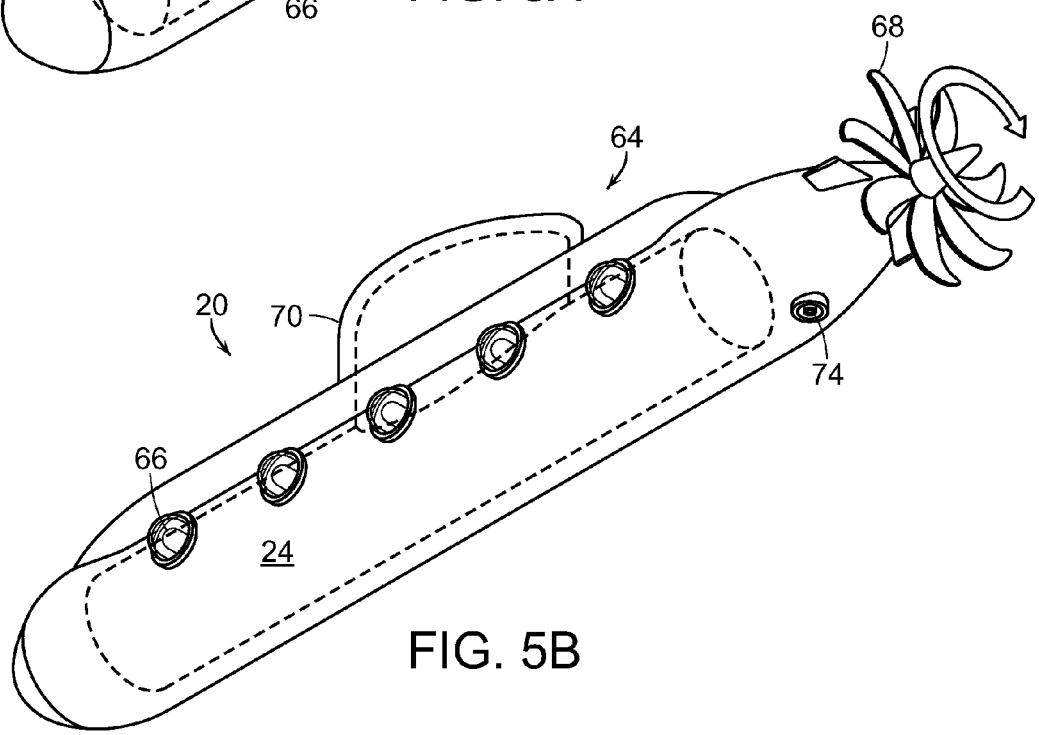
FIG. 5B is a lower perspective view of a dual use package that resembles a submarine.

FIGS. 5A and 5B illustrate yet another embodiment of the dual use package 20 of the present invention. In this embodiment, the package 20 resembles a submarine 64. The submarine preferably includes a plurality of lights 66, i.e., LED or otherwise, disposed along its sides and a rotating propeller 68. The opening 26 is preferably disposed on the top of a tower 70 of the submarine 64. The plug 28 and secondary opening 26a may be included in a cap 38 designed to cover the opening 26 in the top of the tower 70. A fitting 74 is preferably disposed proximate to the propeller 68. An air bubbler tube 76 attached to the fitting 74 preferably introduces air bubbles into the propeller 68 to rotate the same.

FIGS. 6A and 6B illustrate another alternate embodiment of the dual use package 20 of the present invention. This ornamental embodiment is configured to represent a vase 78 having a plant 80 with leaves and stems growing out of the top. The opening 26 is preferably disposed on the bottom of the vase so as to be hidden from view when it is placed in an aquarium. The plug 28 and secondary opening 26a are preferably in the top of the vase among the leaves of the plant 80. A fitting 82 is preferably disposed on the vase 78 so as to receive an air bubbler tube 84. Air introduced into the fitting 82 is preferably released among the leaves of the plant 80 so as to cause the leaves to appear to sway in the water of the aquarium.

Figure 7:
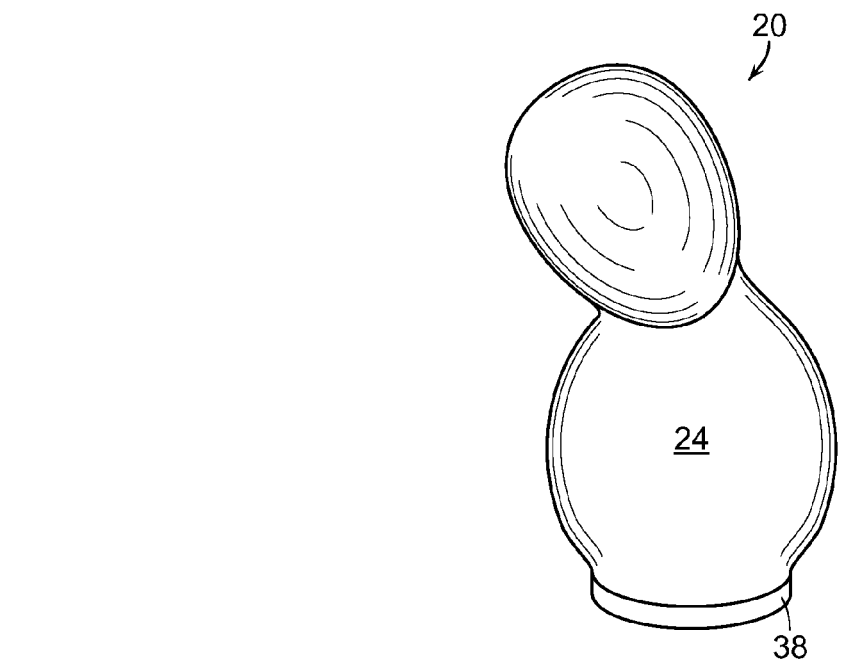
FIG. 7 is a perspective view of a dual use package molded as a support structure.
Figure 8:
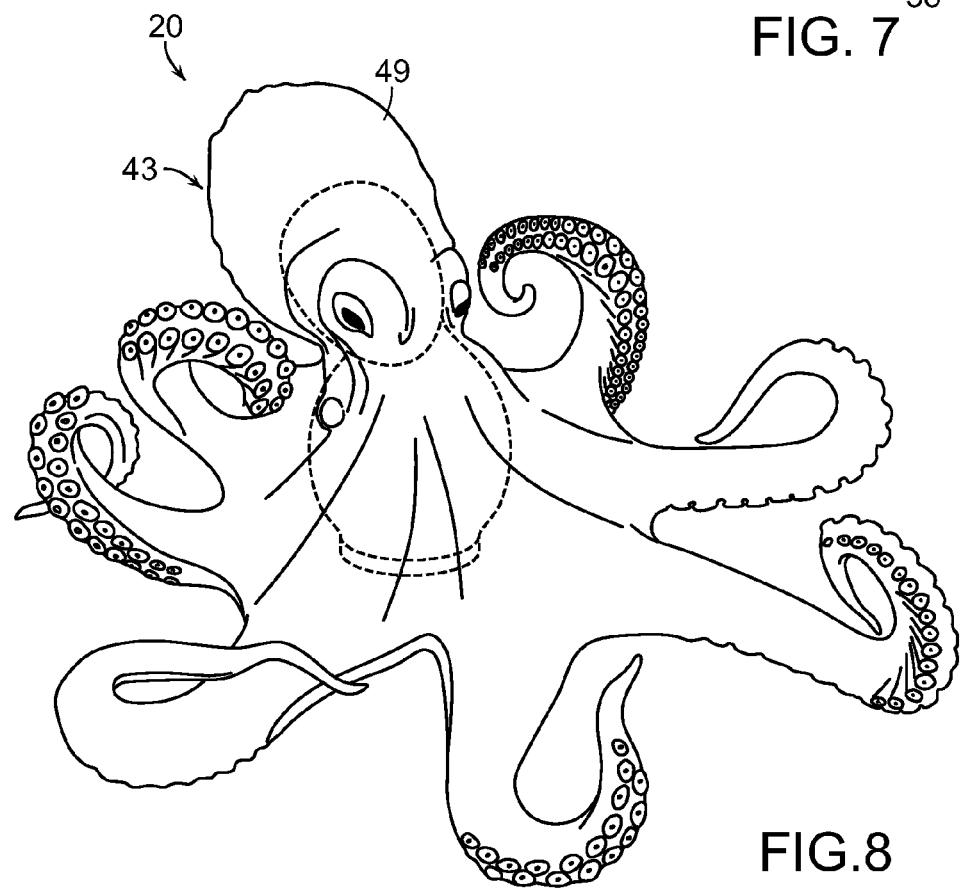
FIG. 8 is a perspective view of the dual use package of FIG. 7 with a decorative covering.

FIGS. 7 and 8 illustrate yet another embodiment of the dual use package 20 of the present invention. In this embodiment, the package 20, as shown in FIG. 7, is of a very simple design and molded to become a support structure for a decorative elastomeric cover 49, illustrated as an octopus 43 in FIG. 8. This elastomeric covering 49 is meant to be stretched over at least a portion of the package 20 when the fish product 30 is depleted and used in an aquarium 88 for decoration. The covering 49 could have a variety of different forms including but not limited to, different sea creatures, different animals, seashells, rocks, etc.

Figure 11:
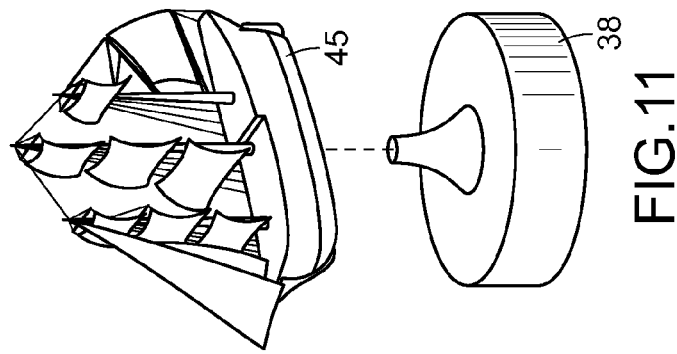
FIG. 11 is an exploded view of the lid of FIG. 10.
Figure 10:
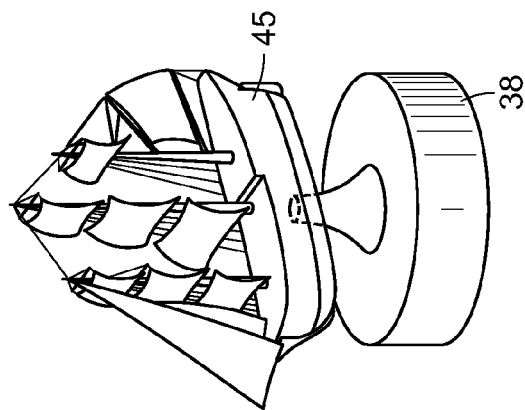
FIG. 10 is a perspective view of the lid of FIG. 9.
Figure 9:
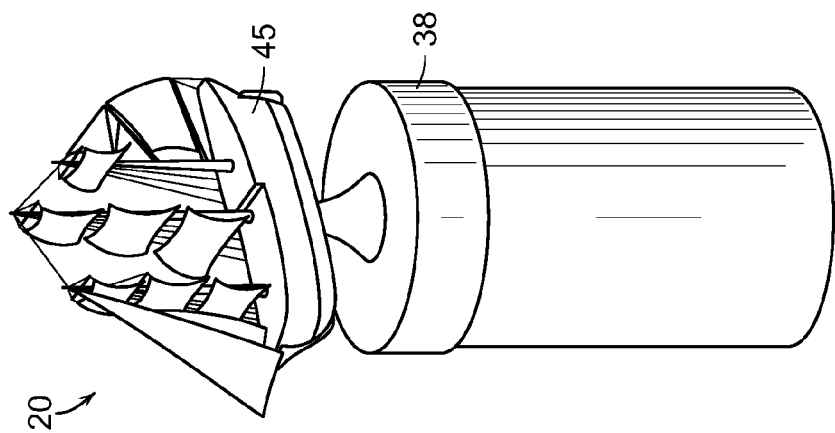
FIG. 9 is a perspective view of a dual use package with an ornament removably attached to the lid.

FIGS. 9-11 illustrate another embodiment of the dual use package 20 and cap 38 of the present invention. In this embodiment, the package 20 is a simple cylindrical container for fish-related product already known in the art and not meant for placement in an aquarium. Again, the cap 38 of this package 20 is the decorative element meant to be placed in the aquarium after the fish-related product 30 is depleted. The cap 38 may have an ornament attached to it, such as a ship 45, which would be solid and not filled with fish-related product. The cap 38 would then act as a gravel tray or anchoring device 96 which could be covered by the rocks or sand of the aquarium 88 to keep the ornament anchored. The ornamental attachment may also be attached to the package 20 itself. The ornamental attachment may also be removable from the package 20 or the cap 38, which would allow the ornamental attachment to be placed by itself in the aquarium 88 without having an anchoring device 96.

Figure 12A:
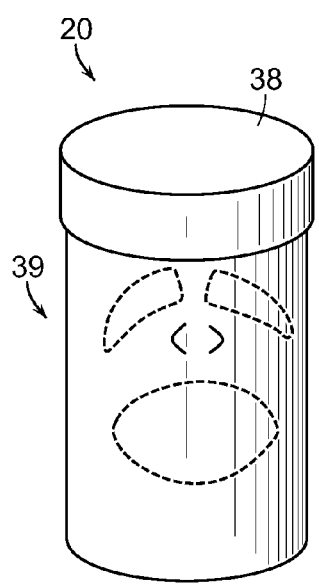
FIG. 12A is a perspective view of a dual use package with punch-out openings as a decorative feature.
Figure 12B:
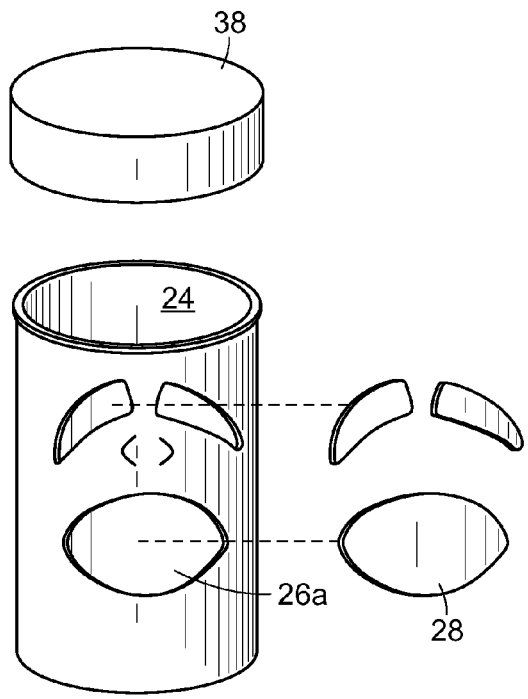
FIG. 12B is an exploded perspective view of the dual use package of FIG. 12A.

FIGS. 12A and 12B, illustrate another embodiment of the dual use package 20 of the present invention. This ornamental embodiment is configured to represent a Mayan statue 39. The secondary openings 26a of this embodiment are designed and placed in order to open up specific design features. For example, in this embodiment the secondary openings 26a are designed to be the eyes and the mouth in the Mayan statue. There are perforations in the plastic around the plugs 28 allowing the plugs to be punched out to open up the design features. It should again be noted that the use of the secondary openings 26a with punch out caps as design features are not limited to a Mayan statue, but may also be used in other ornamental embodiments of the package 20.

Figure 13:
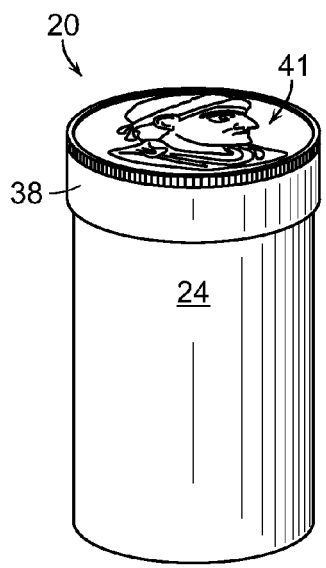
FIG. 13 is a perspective view of a dual use package with a decorative lid.

FIG. 13 illustrates another embodiment of the present invention. In this embodiment, the dual use package 20 is a simple cylindrical package 20 for fish-related product 30 already known in the art and not meant for placement in an aquarium 88. However, the cap 38 of the package 20 is the decorative element meant to be placed in the aquarium 88 after the fish-related product 30 is depleted. The cap 38 of this package 20 may be composed of a solid heavy plastic or filled with ballast 86 so as to sink in water. With this structure, the lid 38 might be molded to resemble an ancient coin 41.

In each of the embodiments, a weighted ballast material 86 is preferably added to the internal compartment 24 before the dual use package 20 is submerged in the water of the aquarium. The ballast 86 may also be added externally to the package 20 to the lid 42, cap 38, closing means, or even the decorative element rather than added separately to the internal compartment 24. The plug 28 is preferably removed from the secondary opening 26a and the package turned upside down or reoriented while submerged so as to allow any excess air trapped in the internal compartment 24 to escape. When adding the package 20 to an aquarium, a user preferably orients the package 20 initially so as to release any excess air from the internal compartment 24. This may be accomplished by removing a cap or other cover from the opening 26 and orienting the package 20 such that the opening is upward and any air in the internal compartment 24 would be replaced by water from the aquarium. Once this is accomplished, the cap may be replaced on the opening 26 and the package 20 positioned in the aquarium as desired.

In addition to the secondary opening 26a being used to allow any excess air trapped in the internal compartment 24 to escape, it can also be used in certain embodiments, as described previously, as a decorative feature as illustrated in FIG. 12. For instance, well designed secondary openings 26a could allow a particular design feature to open up, such as the eyes or mouth of a statue. This feature would allow the ornament to have more depth and realism. Also, if the secondary opening 26a is big enough, it would allow fish or other aquarium animals to swim into and out of the ornament. The plug 28 for the secondary openings 26a meant for this decorative purpose would be a part of the dual use package 20 which would have perforations in the plastic around it allowing the plug 28 to be popped out when the package 20 is empty and ready to be positioned in the aquarium.

Figure 14:
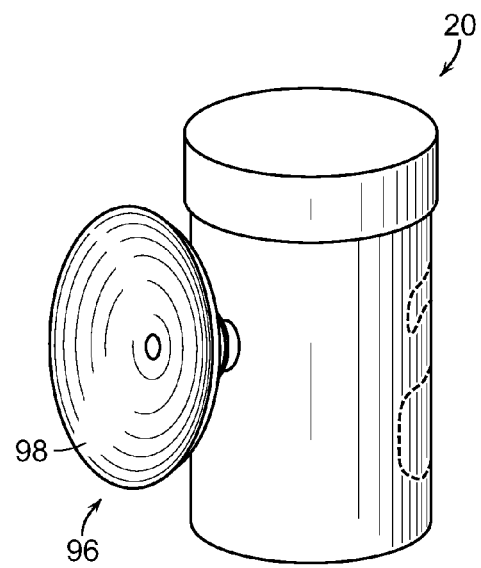
FIG. 14 is a perspective view of a dual use package having an anchoring device attached to a side.
Figure 15:
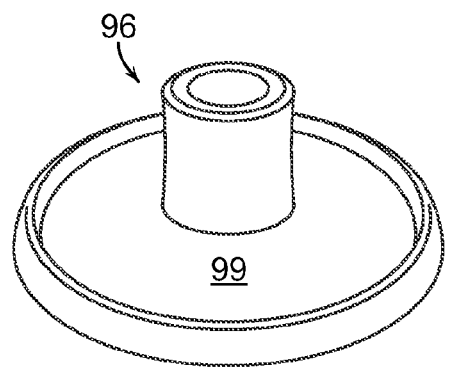
FIG. 15 is a perspective view of an anchor device according to the present invention.
Figure 16:
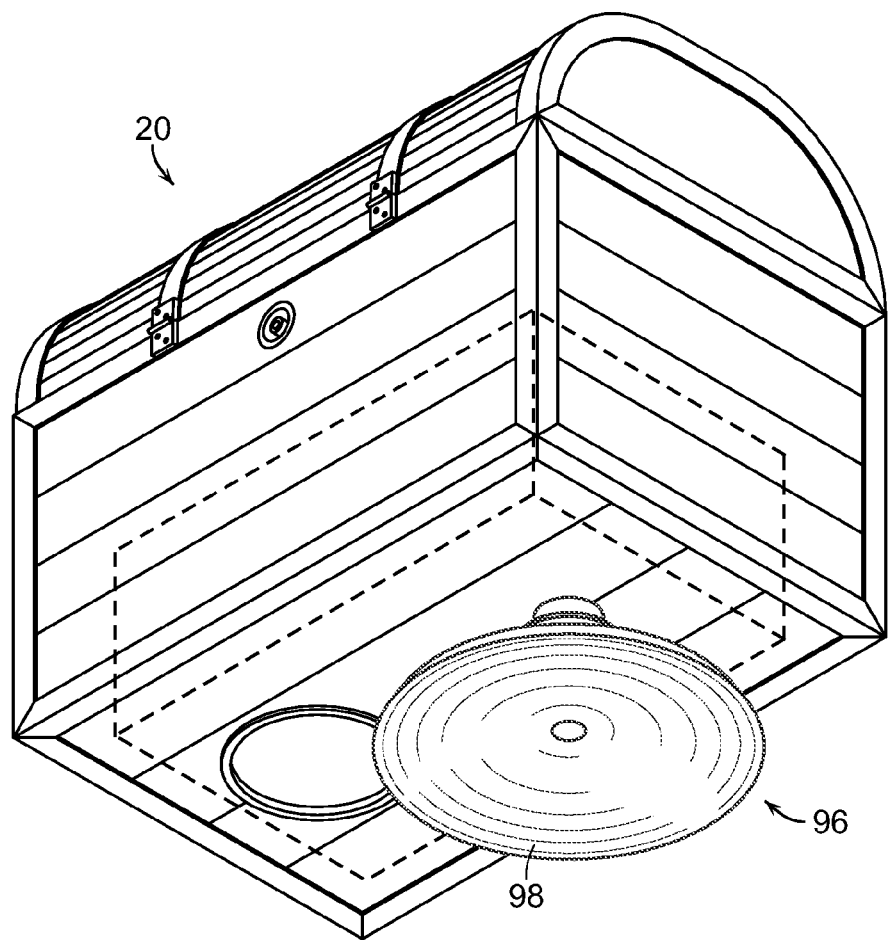
FIG. 16 is a lower perspective view of the anchor device attached to a bottom of a dual use package of the present invention.
Figure 20:
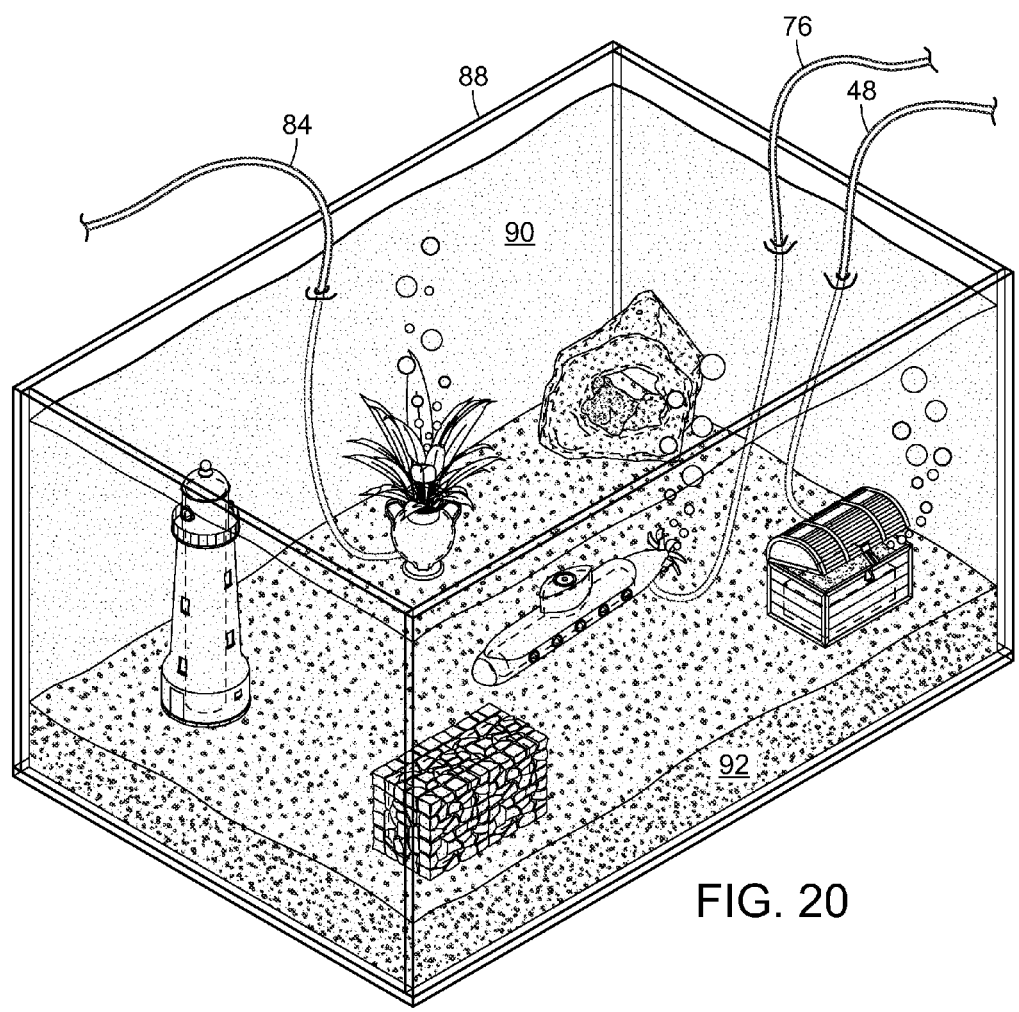
FIG. 20 is an environmental view of the dual use packages of FIGS. 1-6 in an aquarium.
Figure 21:
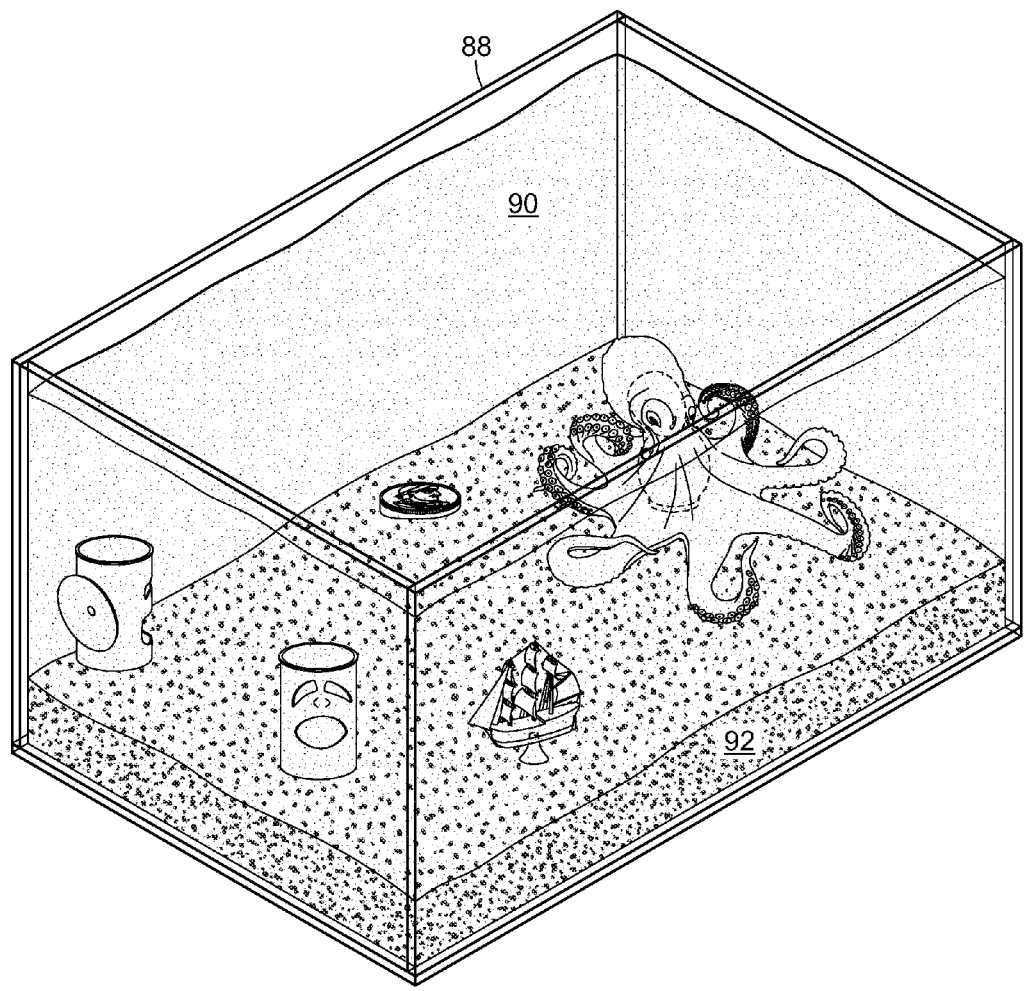
FIG. 21 is an environmental view of the dual use packages of FIGS. 7-13 in an aquarium.

FIGS. 14-16 illustrate an anchor device 96 such as an extended base that is used for anchoring the dual use package 20 to the bottom of an aquarium 88. The anchor device 96 is attached to an underside of the package 20 and then secured to the bottom of the aquarium 88 as by the weight of rocks 92 or other securing mechanism on top of a tray 99. To secure the anchor device 96, one simply maneuvers the package 20 back and forth to allow gravel or rocks 92 to surround and rest on top of the tray 99 on the anchor device 96. The weight of the gravel or rocks 92 will hold the anchor device 96 against the bottom of the aquarium 88 and likewise prevent the package 20 from floating in the water 90. The exact shape, configuration and design of the anchor device 96 may vary so as to securely anchor the particular package 20. The anchor device 96 may alternatively comprise a suction cup 98 (FIG. 16) that attaches itself to the bottom glass of the aquarium 88. Furthermore, the anchoring device 96 is not limited to being attached to the underside of the package 20, but may be attached to any part of the package 20, such as the side (FIG. 14), the lid, or the cap 38. This feature would allow for the package 20 to be secured to the bottom or sides of the aquarium, as seen in FIGS. 17, 20, and 21.

Figure 17:
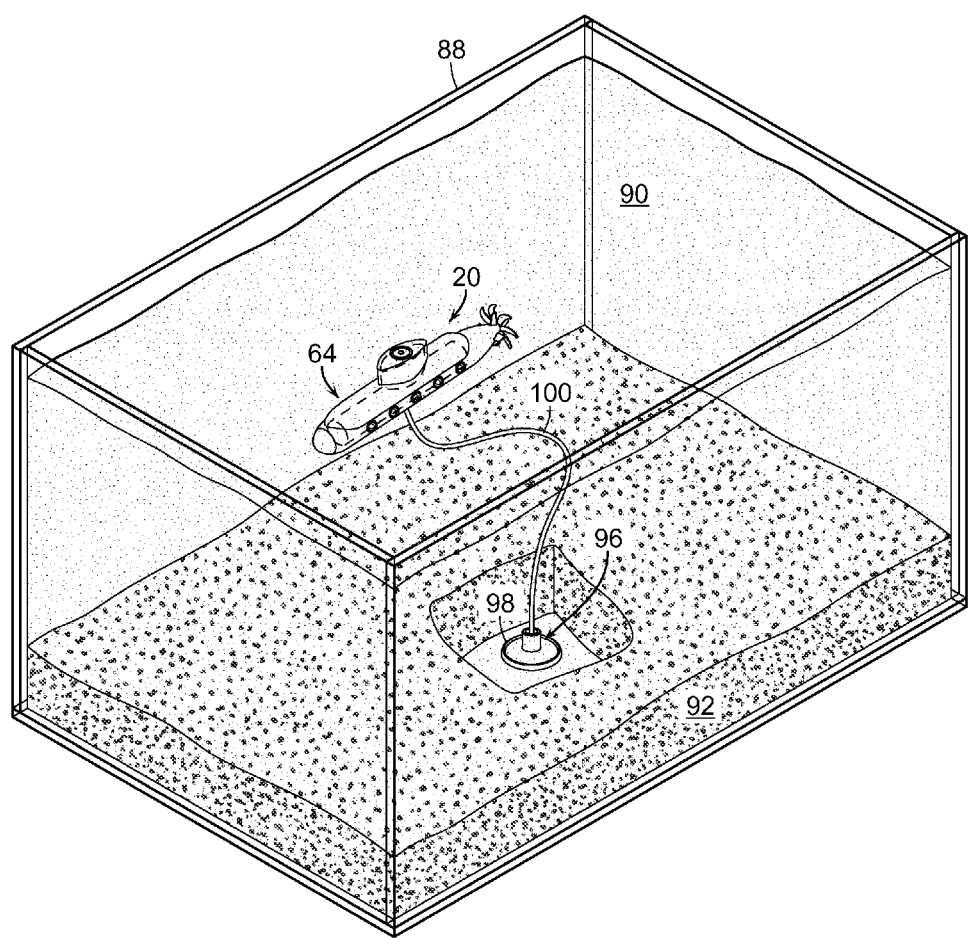
FIG. 17 is an environmental view of an alternate embodiment of the dual use package of the present invention.

FIG. 17 illustrates another alternate embodiment in which the package 20 is configured to float in the water 90 of the aquarium 88 between the top and bottom of the same. In this embodiment, the package 20—in any of the various decorative configurations—is configured to trap air within the internal compartment 24 so as to provide buoyancy to the package 20. A structure such as the anchor device 96 is provided with a suction cup 98 or tray 99 as described and secured to the bottom glass of the aquarium 88. FIG. 17 illustrates the gravel 92 moved away from the anchor device 96 for clarity. In actual use, the gravel 92 is preferably moved to cover the anchor device 96. A fine wire or string 100 connects the package 20 to the anchor device 96.

When submerged under water, the buoyancy of the dual use package 20 will cause the same to float toward the surface of the water 90. The string 100 will prevent the package 20 from floating all the way to the surface of the water 90. When under water, the string 100 should be virtually invisible as would fishing line, cable, thread, wire, or similar material that is thin or of fine thickness. The string 100 may either be taut or flexible to allow the package 20 to float around and simulate movement. In this embodiment, the package 20 does not require ballast or other weighted material. In fact, the package 20 should be as light as possible to maximize the buoyancy. Any plugs 28 or similar structures provided for a release of air can be left in place. The package 20 may come in other shapes or ornamental configurations such as hot air balloons, fish, sharks, airplanes, blimps, space ships, etc.

In any of the foregoing embodiments, the surface of the dual use package 20 may be adorned with a mirror, lenticular, or holographic material that produces three-dimensional or moving images on a two-dimensional surface. Such material may be adhered to the outer surface of the container to produce a desired visual presentation. In particular, appliqués constructed to give the illusion of depth perception on a two-dimensional object may be applied to the outer surfaces of the containers. On curved surfaces, the appliqués may be wrapped or crimped to turn the corners. Such appliqués may provide static three-dimensional imagery, or may give the illusion of motion as the viewing angle changes.

The surface of the dual use package 20, in any of the embodiments, may also have different molded or applied textures. The rock wall, tunneled rock, and lighthouse, may have a gritty texture applied to them to resemble actual rocks and lighthouse walls. The plant leaves may have a material texture applied to resemble the leaves of a plant. The treasure chest may have molded lines to resemble the grain of the wood used to make chests. A mirrored surface might also be applied as a decorative feature resembling a mirror or any other shining and reflective surface. The texture applied or molded into the different embodiments, should not be limited to the embodiments described, but should include texture for any embodiment to help the package 20 appear more realistic.

Figure 18:
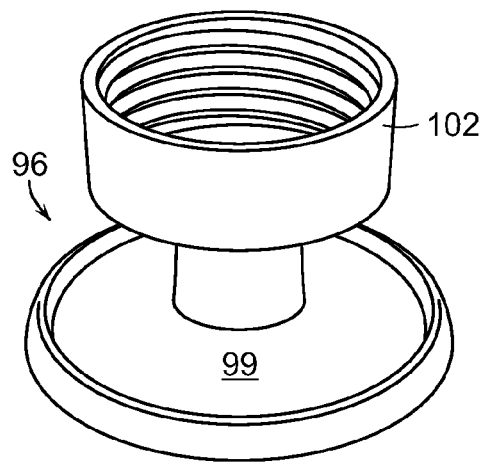
FIG. 18 is a perspective view of an alternate embodiment of the anchor device of FIG. 15.
Figure 19:
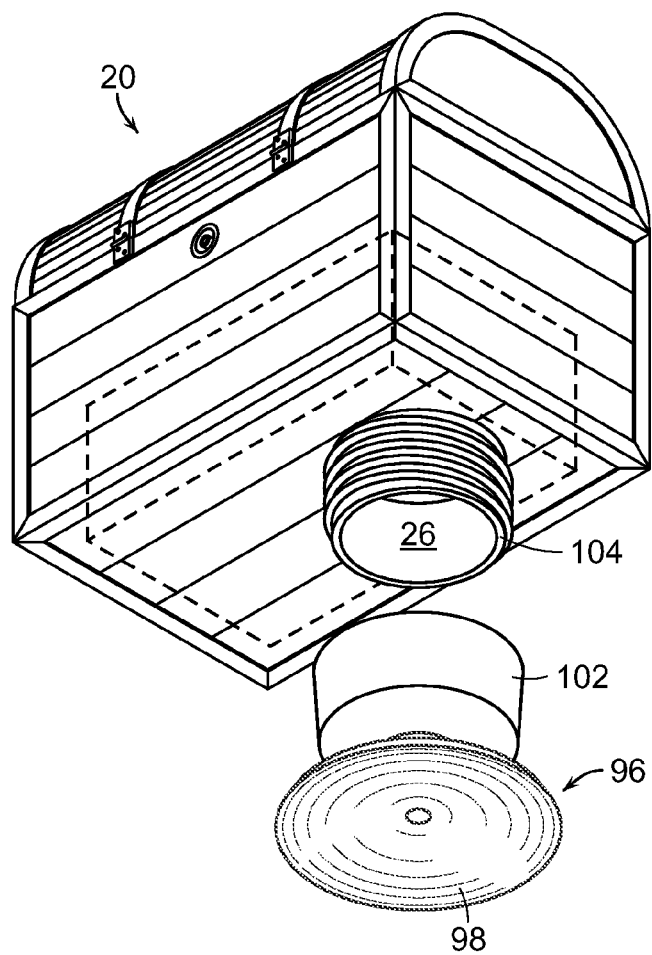
FIG. 19 is a lower perspective exploded view of the alternate embodiment of the anchor device and a dual use package of the present invention.

FIGS. 18 and 19 illustrate an alternate embodiment of the anchor device 96 of the present invention. In this embodiment, the anchor device comprises a threaded cap 102. The threaded cap 102 may have an anchor device 96 attached, being removable, which may include the tray 99 as illustrated in FIG. 18 or the suction cup 98 as illustrated in FIG.

19. The threaded cap 102 is configured to be removably attached to a threaded neck 104 on the opening 26 to the internal compartment 24. With this embodiment, any of the previously described packages 20 may be configured such that the opening 26 is on a base or under side of the package 20. In this way, the package 20 may be used to dispense the contents of the internal compartment 24 and stored upright on the anchor device 96. Once the contents of the internal compartment 24 have been fully dispensed, the package 20 in whatever configuration may be placed upright in the aquarium with the anchor device 96 secured to the bottom glass of the aquarium 88 as described.

FIGS. 20 and 21 illustrate an environmental view of an aquarium 88 containing one sample of each embodiment of the dual use packages 20 of the present invention. The aquarium 88 contains water 90 and rocks 92.

Although various embodiments have been described in detail for purposes of illustration, various modifications may be made without departing from the scope and spirit of the invention. Accordingly, the invention is not to be limited, except as by the appended claims.

What is claimed is:

1. A process for the dual use of packaging for a fish-related product, namely fish food or a fish-related consumable product normally dispensed into an aquarium, comprising the steps of:
    providing a package including a housing having a three-dimensional shape, an internal compartment within the housing for containing a fish food, medicine or aquarium chemicals therein, a primary opening with an associated cover for accessing the internal compartment, and a secondary opening with an associated plug for selectively opening or closing the secondary opening;
    dispensing the fish food or fish-related product from the internal compartment through the primary opening into the aquarium while the package is outside the aquarium;
    after the fish-related product has been completely dispensed from the internal compartment, performing at least one of the following steps:
    a) adding ballast to the internal compartment,
    b) attaching an anchor to the package and securing the anchor within the aquarium, or
    c) causing the package to be buoyant in the water, attaching an anchor to the package by a length of fine cord, and securing the anchor within the aquarium;
    submerging the package in water within the aquarium; and
    utilizing the package as a decorative ornament in the aquarium after it has been submerged in the aquarium below the water surface.

2. The process of claim 1, including the step of reconfiguring the package after dispensing the fish food or fish-related product from the compartment and prior to submerging the package within the aquarium.

3. The process of claim 2, wherein the reconfiguring step includes the step of adding a decorative element to the package.

4. The process of claim 3, wherein the decorative element comprises a light feature.

5. The process of claim 3, wherein the decorative element comprises a decorative elastomeric cover over at least a portion of the package housing.

6. The process of claim 3, wherein the decorative element comprises an appliqué applied, at least in part, to a surface of the package housing.

7. The process of claim 3, wherein the decorative element comprises a bubbler.

8. The process of claim 7, further comprising the step of configuring the bubbler so as to create movement of at least a portion of the reconfigured package when submerged in the aquarium.

9. The process of claim 2, wherein the reconfiguring step includes the step of removing a decorative element from the package.

10. The process of claim 9, including the step of re-associating the decorative element with the packaging.

11. The process of either of claims 2 or 3, further comprising the step of reorienting the reconfigured package while submerged in the aquarium.

* * * * *